Jan. 30, 1940.　　　　F. H. WILLEMAIN　　　　2,188,466
INDICATING DEVICE
Filed Feb. 25, 1939
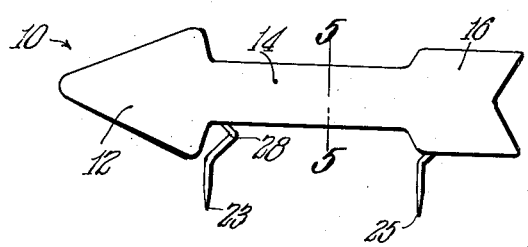
Fig. 1.
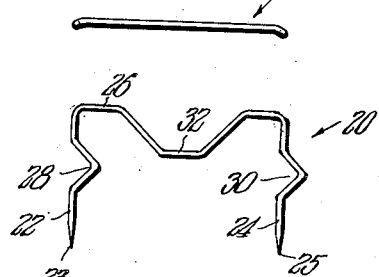
Fig. 2.
Fig. 3.
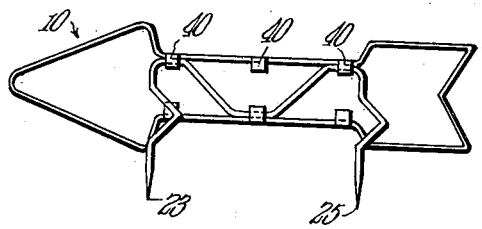
Fig. 4.
Fig. 5.
Inventor
Fernand H. Willemain
By Walter C. Ross.
Attorney Patented Jan. 30, 1940

2,188,466

UNITED STATES PATENT OFFICE 2,188,466

INDICATING DEVICE

Fernand H. Willemain, Holyoke, Mass.

Application February 25, 1939, Serial No. 258,485

1 Claim. (Cl. 40—125)

This invention relates to improvements in indicating devices and the principal object of the invention is directed to the provision of a device adapted to be secured to various objects for indicating direction.

The device is particularly adapted for indicating the direction of movement of a lock-operating lever or handle of an automobile door, although it will be understood that it has many other various and sundry uses.

As special features the indicating device is so made that it may be easily and readily attached to fabrics and the like, such as the upholstery of an automobile door panel, at a point adjacent the operating lever or handle where it is readily visible for indicating direction. Likewise it may be so made that it is just as readily attachable to a wooden panel or the like for other purposes of indicating direction.

Various other novel features and advantages of the invention will be hereinafter referred to in connection with the accompanying description of the invention, in the present preferred form thereof, reference being had to the accompanying drawing wherein:

Fig. 1 is a front elevational view of the indicating device of the invention;

Fig. 2 is a top view of one form of attaching means;

Fig. 3 is a plan view of the means shown in Fig. 2;

Fig. 4 is a rear elevational view of what is shown in Fig. 1;

Fig. 5 is a sectional view on an enlarged scale on the line 5—5 of Fig. 1.

Referring now to the drawing in detail, the invention will be more fully described. Like numerals in different figures refer to like parts.

In Fig. 1, the main body of the indicating device of the invention is generally indicated by 10 and it is preferably in the form of an arrow. This part may be made from sheet metal or the like and it is formed to have a pointed forward end portion 12, a relatively narrow intermediate portion 14, and an enlarged rear end portion 16.

One form of an attaching or supporting member, generally indicated by 20, is shown in Figs. 2 and 3 and comprises two downwardly extending portions 22 and 24 connected together at their upper ends by a transverse portion 26. According to this form, said portions 22 and 24 have their lower ends pointed as at 23 and 25 respectively so that they may readily pierce fabric or the like.

Preferably, too, the parts 22 and 24 have offset portions such as 28 and 30 intermediate the opposite ends thereof. Thus when the pointed ends are inserted in fabric or the like, the portions 22 and 24 are not too easily loosened therefrom.

The downwardly extending portions 22 and 24 are furthermore offset with respect to the plane of the cross portion 26 as is shown in Fig. 2. This is for purposes which will hereinafter be more fully explained and said member 26 may also be formed to have an intermediate portion 32 which is offset with respect to its main body part, as shown in Fig. 3.

Lip portions 40 are provided on the rear side of the indicating member 10 and these may consist of bent-over parts integral with the same and forming spaces for receiving the various parts of the member 20 as shown in Fig. 4. It will be noted that the member 20 is engaged by said lip portions both along its upper side as well as along its central part 32 and that the lips 40 are on opposite edges of the indicating member 10.

The member 20 may become associated with the indicating member 10 by urging the former sidewise so that it slides under the said lip portions. Since the downwardly extending portions 22 and 24 are offset from the plane of the cross member, they are not interfered with by the indicating member.

As a further feature of the invention, the indicating member may be coated with a luminous material or with some material which glows so that in darkness the arrow may be readily visible for its direction indicating function thereby enhancing the usefulness of the device.

An important feature of the device is that its construction is such that it is very thin so that it does not bulge or project objectionably out from the fabric or the wall. Furthermore, being thin, they are packed more readily and more economically than they otherwise would be.

While I have described the invention in great detail and with respect to the present preferred form thereof, it is not desired to be limited thereto since changes and modifications may be made therein without departing from the spirit and scope of the invention. The invention may be embodied in other specific forms without departing from the essential characteristics thereof. The present embodiments are therefore to be considered in all respects as illustrative and not restrictive, the scope of the invention being indicated by the appended claim rather than by the foregoing description, and all changes which come within the meaning and range of equivalency of the claim are therefore intended to be embraced therein.

What it is desired to claim and secure by Letters Patent of the United States is:

An indicating device comprising in combination, a reversible plate member having means adapted to indicate one direction when in a certain position and to indicate an opposite direction when in a reverse position and consisting of a plate having spaced portions along its upper and lower marginal edges which are bent over inwardly towards each other and spaced from the plate to form open end and intermediate pockets on opposite marginal edges with the pockets at one marginal edge opening inwardly towards those at the other, and a supporting member formed from a length of wire to have spaced substantially parallel prongs extending from opposite ends of a transverse portion with the transverse portion having end pocket portions and an intermediate offset pocket portion, the end pocket portion being receivable in the end pockets at either edge of said plate member with the offset portion being receivable in the intermediate pocket of the opposite edge of said plate member, all adapted and arranged in cooperative relationship whereby said plate member may be secured to said supporting member to indicate either one of two directions relative thereto.

FERNAND H. WILLEMAIN.